United States Patent
Kanapata et al.

(10) Patent No.: US 11,327,678 B2
(45) Date of Patent: May 10, 2022

(54) RESTORING DIFFERENTIAL DATA DURING DEVICE MIGRATION

(71) Applicant: Druva Inc., Sunnyvale, CA (US)

(72) Inventors: Sudhakara Rao Kanapata, Pune (IN); Harshit Rai, Pune (IN); Zuaib Sayyad, Pune (IN); Somesh Jain, Pune (IN)

(73) Assignee: Druva Inc., Sunnyvale, CA (US)

( * ) Notice: Subject to any disclaimer, the term of this patent is extended or adjusted under 35 U.S.C. 154(b) by 0 days.

(21) Appl. No.: 17/154,616

(22) Filed: Jan. 21, 2021

(65) Prior Publication Data

US 2021/0247923 A1 Aug. 12, 2021

(30) Foreign Application Priority Data

Feb. 10, 2020 (IN) .............................. 202041005746

(51) Int. Cl.
G06F 12/00 (2006.01)
G06F 3/06 (2006.01)

(52) U.S. Cl.
CPC ............ *G06F 3/0647* (2013.01); *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | | |
|---|---|---|---|
| 2006/0212671 A1* | 9/2006 | Todd ..................... | G06F 3/0665 711/165 |
| 2020/0372163 A1* | 11/2020 | Chung ................. | G06F 3/0611 |
| 2020/0379660 A1* | 12/2020 | Ciudad ................ | G06F 3/0632 |
| 2020/0379946 A1* | 12/2020 | Coffman ............... | G06F 3/0647 |

* cited by examiner

*Primary Examiner* — Jason W Blust
(74) *Attorney, Agent, or Firm* — Fenwick & West LLP

(57) ABSTRACT

A system identifies and causes transmission of differential data generated during device migration. An administrative server accesses a first backup snapshot of a retiring client device. The first backup snapshot includes a set of files stored in the retiring client device during a first checkpoint. The administrative server transmits the set of files in the first backup snapshot to a replacement client device. A cloud server stores the first backup snapshot and a second backup snapshot of the retiring client device. The second backup snapshot is created during a second checkpoint occurring after transmission of the set of files. The cloud server receives an indication that a user has logged on to the replacement client device and causes a transmission of differential data to the replacement client device. The differential data includes at least one file in the second backup snapshot that is not included in the first backup snapshot.

20 Claims, 8 Drawing Sheets

RESTORING DIFFERENTIAL DATA DURING DEVICE MIGRATION

CROSS REFERENCE TO RELATED APPLICATIONS

This application claims the benefit of priority to Indian Provisional Patent Application No. 202041005746, filed on Feb. 10, 2020, which is incorporated herein by reference in its entirety for all purposes.

BACKGROUND

During device migration, it is important for data from the retiring device to be transferred to the replacement device. Conventional methods for transferring data from a retiring device to the replacement device use an automated backup of data on the retiring device, which may be transmitted to the replacement device. However, problems arise in situations where users of the devices do not have enough bandwidth due to site restraints (e.g., being in a location where the bandwidth is not available) or due to other restraints, such as lacking administrative permissions required to access the backup or to perform the transmission.

BRIEF DESCRIPTION OF THE DRAWINGS

Figure (FIG.) 1 is a high-level block diagram illustrating a system environment including a cloud server.

Figure 1:
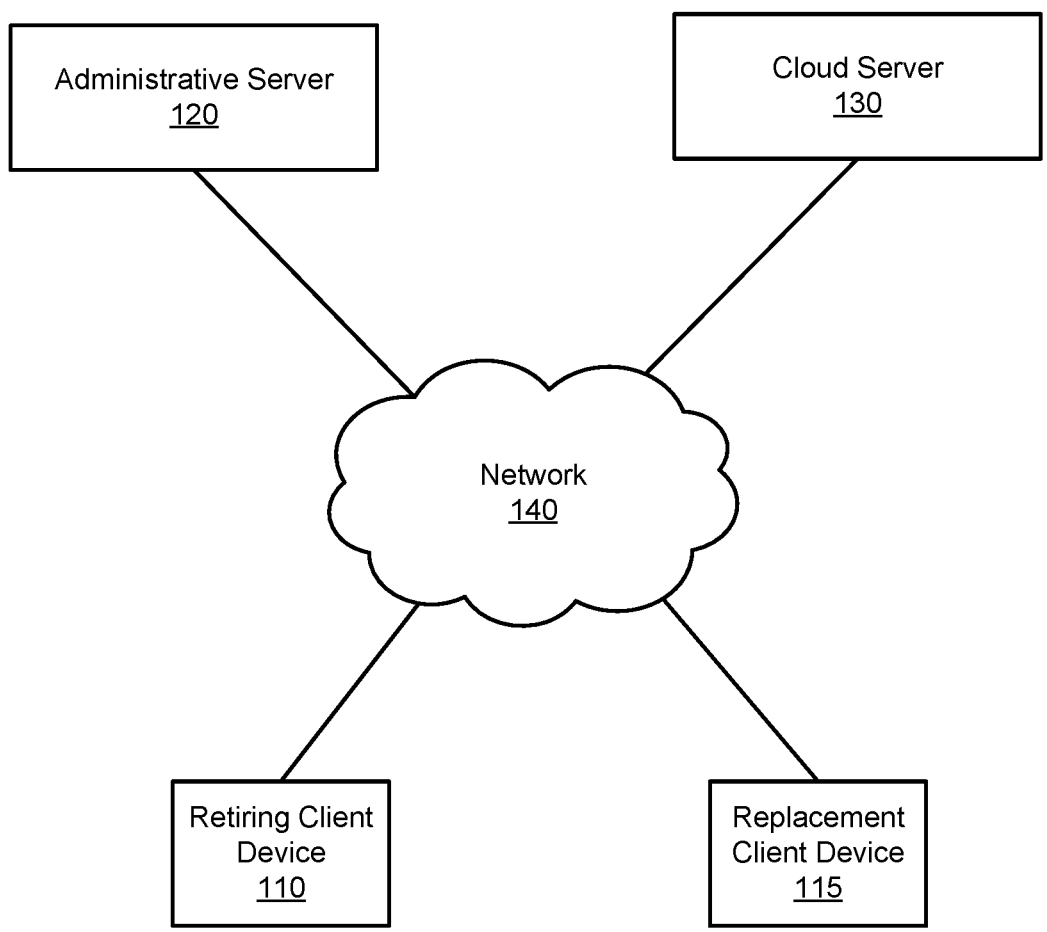

The figures depict various embodiments of the present invention for the purposes of illustration only. One skilled in the art will readily recognize from the following discussion that alternative embodiments of the structures and methods illustrated herein may be employed without departing from the principles of the invention described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Configuration Overview

This disclosure relates generally to data restoration, and more particularly to restoring differential data created during device migration.

In some situations during device migration processes, replacement devices are shipped to an administrator site, where high bandwidth is expected to be available. An administrator or user at the administrator site performs the transfer of data from the automated backup and the replacement device is shipped to the first user. However, for cases with high shipping times, data continues to be generated by the user on the retiring device during the shipping period. This generated data may be lost upon receipt of the replacement client device. There is a need for a method of restoring differential data created during device migration.

The above and other issues may be addressed by a system for identifying differential data based on backup snapshots. By identifying differential data created during device migration, the system is able to transmit the data that is not restored from a first backup snapshot to a replacement device, ensuring that the differential data is not lost.

An administrative server may access and transmit a first backup snapshot of a retiring client device to a replacement client device. The first backup snapshot of the retiring client device includes a set of files stored in the retiring client device scanned during a first checkpoint. A cloud server communicatively coupled to the administrative server may store the first backup snapshot and a second backup snapshot. The second backup snapshot is created during a second checkpoint that occurs after the transmission of the set of files in the first snapshot to the replacement client device. When a user logs on to the replacement client device with the set of files of the first client device, the cloud server may cause a transmission of differential data to the replacement client device. The differential data includes at least one file in the second backup snapshot that is not included in the first backup snapshot.

In an embodiment, the cloud server may identify the differential data by accessing sets of version identifiers associated with the sets of files included in the first backup snapshot and the second backup snapshot. The version identifiers may correspond to checkpoints (e.g., based on timestamp). Based on the version identifiers, the cloud server may identify files having version identifiers corresponding to a checkpoint that occurs after the first checkpoint as being differential data.

In another embodiment, the cloud server may access a file directory associated with the second backup snapshot of the retiring client device. The file directory includes metadata describing each file stored in the file directory. In an embodiment, the cloud server accesses the metadata and identifies one or more files wherein the metadata describing the file of the second backup snapshot is different than the metadata describing the file corresponding to the first backup snapshot. The cloud server identifies the one or more files as being differential data. In other embodiments, an application on a client device performs one or more of these steps. For example, a replacement client device accesses the metadata and identifies one or more files as being differential data.

In another embodiment, the cloud server may access a journal describing one or more change events for files of the retiring client device. The journal includes metadata describing a timestamp or other numeric or alphabetic sequence for one or more change events described in the journal. For example, the metadata describes a time at which a change event occurred. In another example, the metadata describes a number indicating a time order in which one or more change events occurred. The cloud server identifies one or more files as differential data based on timestamps or sequences after the first checkpoint for the retiring client device.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure (FIG.) 1 is a block diagram illustrating an example system environment 100 for data restoration during device migration, according to an embodiment. The environment 100 may include a retiring client device 110, a replacement client device 115, an administrative server 120, a cloud server 130, and a network 140. Various devices and servers may communicate locally or may communicate via the network 140. While only a single instance of retiring client device 110, replacement client device 115, administrative server 120, and cloud server 130 are shown in FIG. 1, various embodiments of the environment 100 can have many such entities connected to the network 140. Other components may also be connected to the network 140.

A client device may be a computing device that can transmit and/or receive data via the network 140. Users may use the client device to perform functions such as accessing, storing, creating, and modifying files, accessing digital content, and executing software applications. For example, the client device may be a smartphone or a tablet, notebook, or desktop computer. In addition, the client device may be an Internet-of-Things (IoT)-connected device such as part of a home appliance. In some embodiments, the retiring client device 110 and the replacement client device 115 share a device type or functionality. For example, in one example case, the retiring client device 110 and the replacement client device 115 are both work laptop for an employee. In other embodiments, the retiring client device 110 and the replacement client device 115 may be different types and may have different functionalities. In some cases, the client device 110 and the client device 115 may be the same device. Furthermore, while client device 110 is described as a retiring client device 110 for the ease of reference, the operation of the client device 110 does not need to cease after the data is migrated to the replacement client device 115. In some embodiments, the retiring client device 110 and the replacement client device 115 may be respectively referred to as source device and destination device, or simply as a first device and a second device.

An administrative server 120 may transmit data from a retiring client device 110 to a replacement client device 115. The administrative server 120 may access data represented as a first backup snapshot on a retiring client device 110 and transmit the data to the replacement client device 115. The transmitted backup snapshot may be a set of files stored by the retiring client device 110, such as a user's previously generated documents and metadata.

In an embodiment, the administrative server 120 may be located at a first location that is geographically separate from the cloud server 130 and may transmit data to a replacement client device 115 using a high bandwidth network that may not be accessible to a user of the retiring client device 110. In an example case, an administrative server 120 may be a local corporate server that provides high speed data restoration service but is geographically separate from an employee who possesses the retiring client device 110. For example, the administrative server 120 may be located at corporate headquarters or an information technology center of a corporation while employees, who are using the retiring client devices 110, are working at locations remote from the administrative server 120. In another embodiment, the administrative server 120 is not geographically separate from the cloud server 130. In one embodiment, an administrative agent that may be installed in the retiring client device 110 and/or the replacement client device 115 may be used in place of the administrative server 120. The tasks performed by the administrative server 120 described herein may be instead performed by the administrative agent. The transmittal may be triggered by administrative agent responsive to an administrator log-in or other action on the retiring client device 110 or the replacement client device 115. An example administrative agent may be a software application installed in the replacement client device 115.

A cloud server 130 may communicate with various client devices 110 and 115 via the network 140 for capturing the snapshots and/or file changes of a client device. The cloud server 130 may also work with the administrative server 120 to cooperatively perform data restoration of a replacement client device 115 by enabling the transmittal of differential data captured by the cloud server 130 to a replacement client device 115 via the network 140. In one embodiment, the administrative server 120 may perform the bulk of the data restoration using a high bandwidth network and the cloud server 130 may carry out any fine changes in the restoration. For example, after the administrative server 120 transmits a first backup snapshot to the replacement client device 115, the replacement client device may be shipped or returned to a user. Responsive to the user's login to the replacement client device, the cloud server 130 identifies differential data generated on the retiring client device 110 between the first checkpoint corresponding to the first backup snapshot and a second checkpoint corresponding to a second backup snapshot. In an embodiment, the second checkpoint may be at a current time (e.g., at the time of login) or may be the latest checkpoint (e.g., a most recent backup). In other embodiments, the second checkpoint may occur at previous times. When the differential data is identified, the cloud server 130 causes transmission of the differential data to the replacement client device 115.

In one embodiment, the network 140 uses standard communications technologies and/or protocols. The network 140 provides connections to the components of the system 100 through one or more sub-networks, which may include any combination of local area and/or wide area networks, using both wired and/or wireless communication systems. In one embodiment, a network 140 uses standard communications technologies and/or protocols. For example, a network 140 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), or JSON. In some embodiments, all or some of the communication links of a network 140 may be encrypted using any suitable technique or techniques such as secure sockets layer (SSL), transport layer security (TLS), virtual private networks (VPNs), Internet Protocol security (IPsec), etc. The network 140 also includes links and packet switching networks such as the Internet.

Example Server Architectures

Figure 2A:
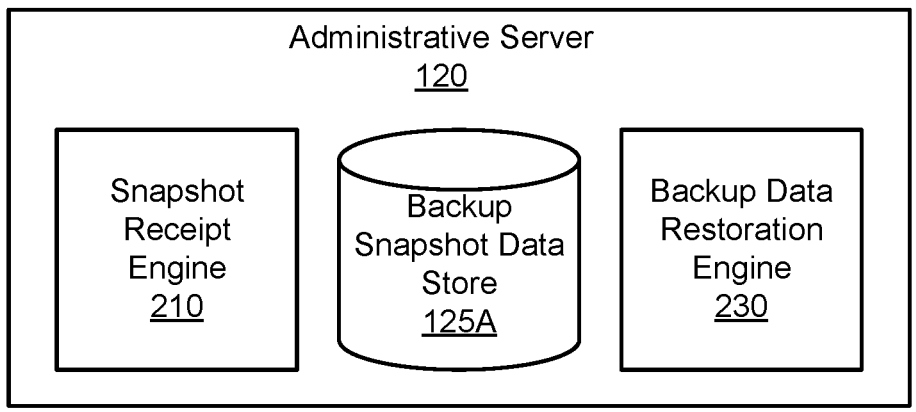
FIG. 2A is a block diagram of an architecture of an administrative server, according to one embodiment.

FIG. 2A is a block diagram of an architecture of an example administrative server, according to one embodiment. The administrative server 120 shown in FIG. 2 includes a backup snapshot data store 125A, a snapshot receipt engine 210, and a backup data restoration engine 230. Components of the administrative server 120 may include all or a subset of the example computing system illustrated and described with FIG. 8. In some embodiments, the administrative server 120 is associated with a geographic location with high bandwidth for data transmittance. In some embodiments, the administrative server 120 may include additional, fewer, or different components for various applications. For example, other possible components such as network interfaces, security functions, load balancers, failover servers, management and network operations consoles, and the like are not shown.

The snapshot receipt engine 210 may receive backup snapshot data and metadata associated with the backup snapshot data from various client devices such as retiring client devices 110 and may store the received data in the backup snapshot data store 125A. The snapshot receipt engine 210 may receive backup snapshot data from a retiring client device 110 responsive to an automatic (e.g., an automatic, periodic backup; a backup triggered automatically by an event) or manual (e.g., user or administrator initiated) backup of the retiring client device. The snapshot receipt engine 210 stores the received backup snapshot data and the corresponding metadata in a backup snapshot data store 125A such that it may be accessed to restore data.

The backup snapshot data store 125A stores backup snapshot data received from retiring client devices 110. A backup snapshot is a set of files of a retiring client device 110 (or another client device) during a checkpoint. For example, a snapshot may be an image of the storage (or a portion of the storage) of a device that is captured at a particular moment in time. The moment in time may be referred to as a checkpoint. A snapshot may be a complete image or an incremental image. For example, an initial backup of a device may generate a snapshot that captures a complete image of a set of files in the device. Subsequent checkpoints may generate snapshots of incremental images that represent the differential changes of the device. The backup snapshot may additionally include metadata associated with the files, such as timestamps of changes, timestamps of access, ACL checksums, attribute checksums, and other like metadata. In some embodiments, the backup snapshot data store 125A includes one or more backup snapshots for a retiring client device 110 taken over one or more checkpoints.

The backup data restoration engine 230 may provide restoration of a backup to a client device. For example, the backup data restoration engine 230 may transmit backup snapshots of retiring client devices 110 to replacement client devices 115 when a user is in a process of replacing a computing device. Responsive to a request by a user of the administrative server 120, the backup data restoration engine 230 may access the backup snapshot data store 125A and identify a backup snapshot for a retiring client device 110. In some embodiments, the identified backup snapshot is the latest backup snapshot (e.g., associated with a most recent timestamp). In other embodiments, the identified backup snapshot is a backup snapshot corresponding to a checkpoint specified by the request. The backup data restoration engine 230 transmits the identified snapshot to the replacement client device 115, such that files included in the snapshot are stored by the replacement client device. In some embodiments, the backup data restoration engine 230 copies the backup snapshot to a temporary location of the replacement client device 115. The backup snapshot is later copied from the temporary location of the replacement client device 115 to a user account by the administrative server 120 or another entity.

Figure 2B:
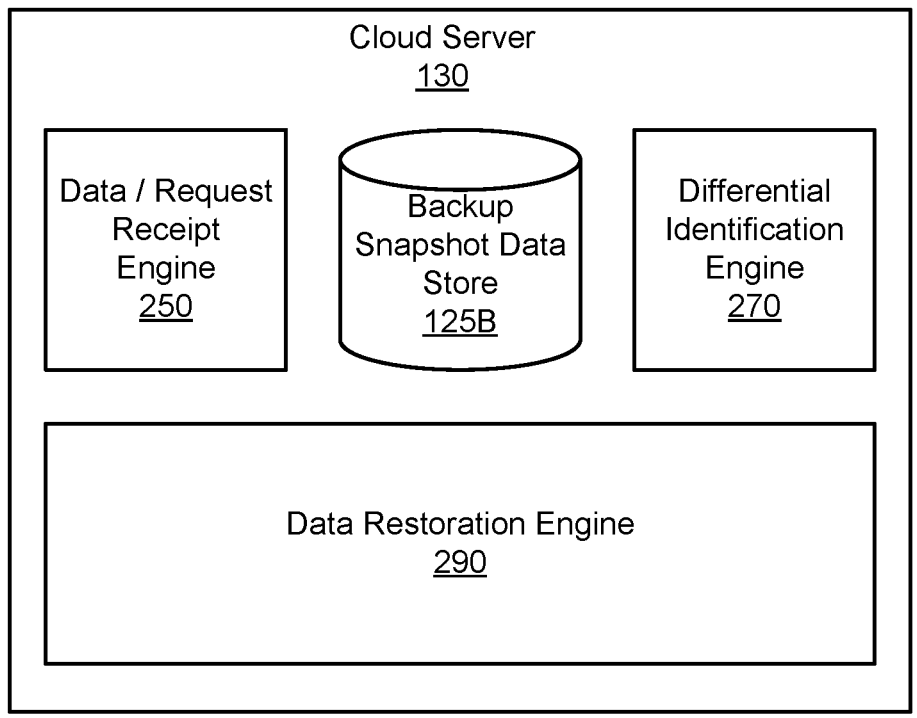
FIG. 2B is a block diagram of an architecture of a cloud server, according to one embodiment.

FIG. 2B is a block diagram of an architecture of an example cloud server, according to one embodiment. The cloud server 130 shown in FIG. 3 includes a backup snapshot data store 125B, a data/request receipt engine 250, a differential identification engine 270, a data restoration engine 290. Components of the cloud server 130 may include all or a subset of the example computing system illustrated and described with FIG. 8. In some embodiments, the cloud server 130 is associated with a geographic location separate from the geographic location of the administrative server 120. In some embodiments, the cloud server 130 may include additional, fewer, or different components for various applications. In addition, the functionality attributed to specific modules herein may be performed by other modules in other embodiments.

The data/request receipt engine 250 receives requests from a user of the cloud server 130 to restore differential data from a retiring client device 110 to a replacement client device 115. The request includes data such as, for example, a user account for restoring the differential data. The data/request receipt engine 250 transmits the request to be executed by the differential identification engine 270 and the differential data restoration engine 290.

The data/request receipt engine 250 may additionally access and store multiple backup snapshots of retiring client devices 110. In some embodiments, the data/request receipt engine 250 stores a first backup snapshot including a first set of files stored in a retiring client device 110 at a first checkpoint and a second backup snapshot including a second set of files stored in the retiring client device at a second checkpoint. The second checkpoint may occur after transmission of the first backup snapshot to a replacement client device 110 (e.g., by the administrative server 120). The data/request receipt engine 250 may additionally receive metadata describing the backup snapshots and transmits the metadata to be stored by the backup snapshot data store 125B in association with the backup snapshots.

The backup snapshot data store 125B stores backup snapshot data received from retiring client devices 110. As described in conjunction with FIG. 2A, the backup snapshot data store stores the backup snapshot as a set of files corresponding to a retiring client device 110 during a checkpoint. The backup snapshot is additionally associated with metadata describing the backup snapshot and/or the files included in the backup snapshot. In some embodiments, the metadata includes version identifiers; file directories including timestamps of edit or access dates, ACL checksums, or attribute checksums; journals including timestamps for change events; and the like.

The differential identification engine 270 may determine the differences between two or more backup snapshots that are captured in different time frames. For example, the differential identification engine 270 may determine, based on the first and second stored backup snapshots corresponding to a retiring client device 110, differential data for further data restoration to the replacement client device 115, which may be partially restored with first backup snapshot by the administrative server 120.

The differential identification engine 270 may determine the data differences using various suitable processes. For example, in an embodiment, the differential identification engine 270 may access version identifiers associated with the set of files included in the first backup snapshot and version identifiers associated with the set of files included in the second backup snapshot. Version identifiers correspond to the checkpoints at which the backup snapshots were generated. Based on the version identifiers, the differential identification engine 270 identifies files in the second backup snapshot having a version identifier corresponding to a checkpoint occurring after the first checkpoint (e.g., having been created or modified since the first checkpoint). The identified files are transmitted to the differential data restoration engine 290 as being differential data for restoration.

In another embodiment, the differential identification engine 270 may access file directories associated with the first and second backup snapshots of the retiring client device 110. The file directory includes metadata describing each file stored in the file directory, including, for example, timestamps (e.g., timestamps of the last edit, timestamps of last access), an ACL checksum, or an attribute checksum. The differential identification engine 270 may access the metadata describing the files in the set of files of the first backup snapshot and identifies one or more of the files wherein the metadata describing the file corresponding to the second backup snapshot is different than metadata describing the file corresponding to the first backup snapshot. For example, the differential identification engine 270 determines that the metadata describing a file in the second backup snapshot has a later timestamp than the metadata describing the file in the first backup snapshot. The differential identification engine 270 transmits the identified one or more files to the differential data restoration engine 290 for restoration.

In another embodiment, the differential identification engine 270 may access a journal stored by the cloud server 130. In an example, the journal is stored by the backup snapshot data store 125B in association with corresponding backup snapshots. In other examples, the journal is stored in an additional or different data store of the cloud server 130. The journal describes one or more change events for files of the retiring client device 110. A change event may include, for example, an addition, a deletion, or a modification to a file of the retiring client device 110. The differential identification engine 270 accesses metadata of the journal describing timestamps for one or more change events and identifies files having timestamped change events after the first checkpoint for the retiring client device 110. The identified files are transmitted as differential data to the differential data restoration engine 290 for restoration.

In some embodiments, the differential identification engine 270 may determine differential data based on block-wise checksums of the files of the first and second backup snapshots. The differential identification engine 270 may access a first file of the set of files of the second backup snapshot and a corresponding file of the set of files of the first backup snapshot and generates block-wise checksums for each of the accessed files. The differential identification engine 270 compares the block-wise checksums of the files. If a mismatch is identified between the block-wise checksum of the file of the first backup snapshot and the block-wise checksum of the file of the second backup snapshot, the differential identification engine 270 may transmit the mismatched blocks of the second backup snapshot to the differential data restoration engine 290 for restoration. By identifying and transmitting the mismatched blocks, the differential identification engine 270 reduces the total amount of differential data being sent to the replacement client device 115.

The data restoration engine 290 causes a transmission of restored data to a client device such as a replacement client device 115. The data restoration engine 290 may cause a transmission of differential restoration data or may perform a full restoration. In various embodiments, the data restoration engine 290 may cause the transmission of restored data in different manners. For example, in some embodiments, the data restoration engine 290 causes the cloud server 130 to transmit the differential data to the replacement client device 115. In other embodiments, the data restoration engine 290 causes a client-side server to transmit the differential data to the replacement client device 115, reducing the load of the cloud server 130. In some embodiments, the data restoration engine 290 additionally causes data stored in a temporary location of the replacement client device 115 to be copied to a user account. For example, in cases wherein the administrative server 120 transmits a first backup snapshot to a temporary location of the replacement client device 115, the differential data restoration engine 290 copies the first backup snapshot from the temporary location of the replacement client device to a user account. The temporary location may be, for example, a storage folder or data structure of the replacement client device.

Example Data Migration Transaction Diagram

Figure 3:
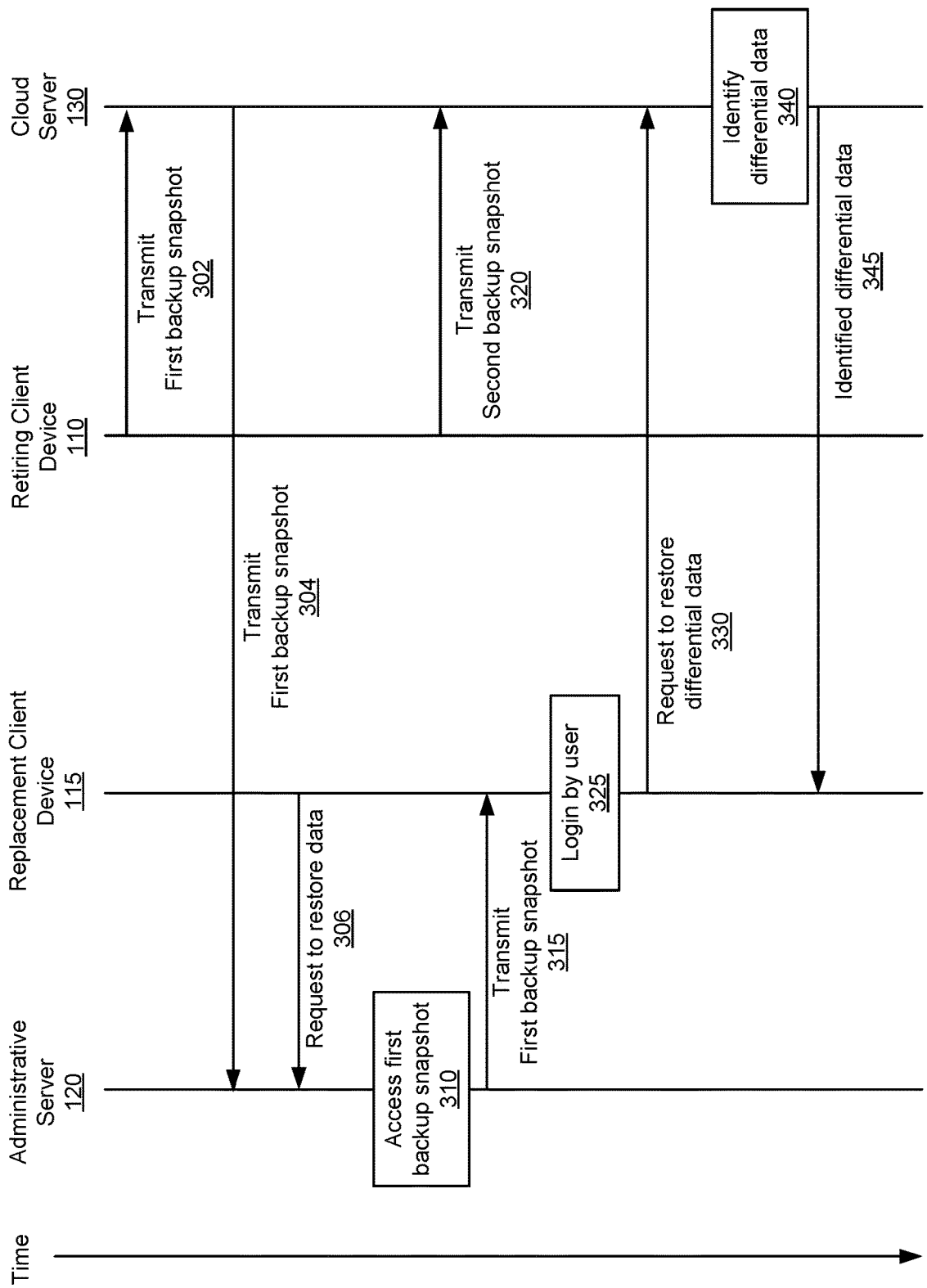
FIG. 3 is a transaction diagram illustrating interactions between a retiring client device, a replacement client device, an administrative server, and a cloud server, according to one embodiment.

FIG. 3 is a transaction diagram illustrating example interactions among a retiring client device 110, a replacement client device 115, an administrative server 120, and a cloud server 130, according to one embodiment. The example interactions illustrated in FIG. 3 may correspond to a data migration process from a retiring client device 110 to a replacement client device 115. A retiring client device 110 may transmit 302 a first backup snapshot to a cloud server 102 and to the administrative server 120. The transmission of the first backup snapshot to the administrative server 120 may occur directly between the retiring client device 110 and the administrative server 120. Alternatively, or additionally, the transmission may occur through the cloud server 130. For example, the retiring client device 110, when it was still in active use, may be in communication with the cloud server 130. The retiring client device 110 may upload backup data to the cloud server 130. The cloud server 130, in turn, transmits 304 the data or make the data available to the administrative server 120.

A replacement client device 115 may request 306 the administrative server 120 to restore data associated with the retiring client device 110. For example, in a device replacement process, the replacement client device 115 may first be possessed by a corporation (e.g., the information technology support department) and an employee may still be using the retiring client device 110. To set up a new client device for the employee, an administrator may cause the replacement client device 115 to request 306 for restoration of data. In response to the request, the administrative server 120 may access 310 a first backup snapshot. The first backup snapshot is, for example, an automated or manual backup copy of files associated with the retiring client device 110 at a first checkpoint. The administrative server 120 may transmit 315 the first backup snapshot to the replacement client 115. In one example, the first backup snapshot may be a complete snapshot of the retiring client device and include a large amount of data. The administrative server 120 may perform the initial restoration of data using a high bandwidth transmission process.

During the data migration process, a user may continue to use the retiring client device 110 after the first backup snapshot was captured and during the time when the replacement client device 115 is being restored with the first backup snapshot. In a subsequent checkpoint, the retiring client device 110 may transmit 320 a second backup snapshot to the cloud server 130. For example, the second backup snapshot may occur at a second checkpoint occurring after the transmission of the files of the first backup snapshot by the administrative server 120 to the replacement client device 115.

The data migration process may continue as a user log in 325 to the replacement client device 115. For example, after an initial round of restoration of data by the administrative server 120, the replacement client device 115 may be delivered to the user. The replacement client device 115 may transmit 330 a request to restore differential data to a cloud server 130. The transmission 325 of the request may be triggered by the login 320 of the user, for example, when the user logs in the replacement client device 115 the first time. In response to the request 330 and based on the first and second backup snapshots, the cloud server 130 may identify 340 differential data. The differential data may include one or more files included in the second backup snapshot not included in the first backup snapshot and other modification, addition, and deletion of data blocks and files captured in the second backup snapshot. In the example of FIG. 3, the cloud server 130 may transmit 345 the differential data to the replacement client device 115. In other examples, the cloud server 130 may cause a transmittal of the differential data to the replacement client device 115 through other manners (e.g., by causing the retiring client device 110 to transmit the data to the replacement client device 115).

Example Processes

Figure 4:
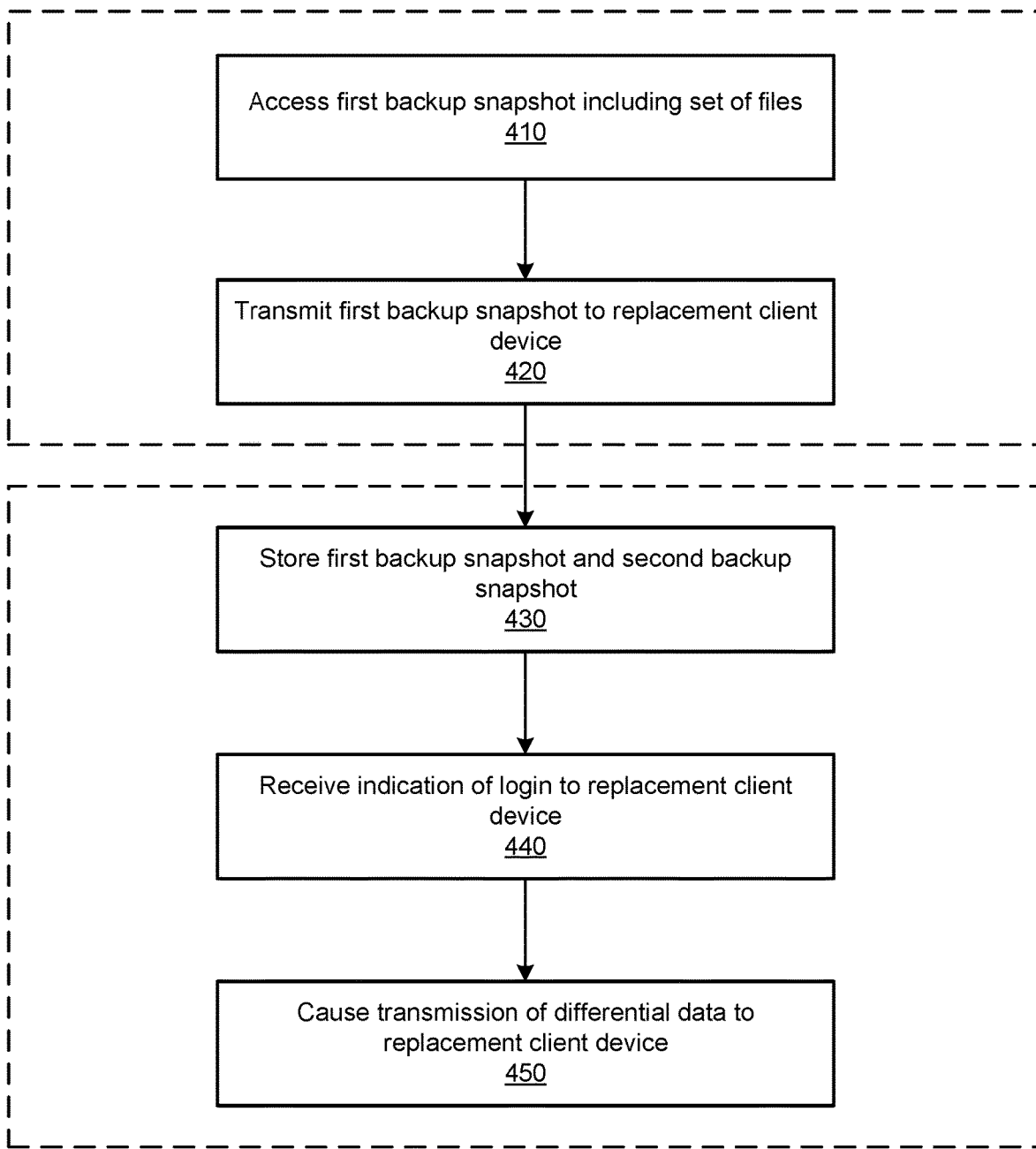
FIG. 4 is a flowchart illustrating a method of restoring differential data, according to one embodiment.

FIG. 4 is a flowchart illustrating an example process of restoring data from one device to another, according to one embodiment. The steps of FIG. 4 may be performed by the administrative server 120 and/or the cloud server 130 as described below. For example, in FIGS. 4, 5, 6, and 7, while a step is described to be performed by the administrative server 120, the step may also be performed by the cloud server 130, and vice versa. Some or all of the steps may be performed by other engines or entities in other embodiments. In addition, other embodiments may include different and/or additional steps and the steps may be performed in different orders.

An administrative server 120 may access 410 a first backup snapshot of a retiring client device 110. The first backup snapshot includes a set of files stored in the retiring client device 110 scanned during a first checkpoint. The first backup snapshot may be, for example, a recent automated backup of the files of the retiring client device 110. The administrative server 120 may transmit 420 the first backup snapshot to a replacement client device 110. In an embodiment, the administrative server 120 performs the accessing 410 and the transmitting 420 at a first geographic location (e.g., an administrator site) where high bandwidth is available for the transfer of data.

A cloud server 130 communicatively coupled to the administrative server 120 may store 430 the first backup snapshot and a second backup snapshot of the retiring client device 110. The second backup snapshot may be created during a second checkpoint that occurs after the transmission of the set of files in the first backup snapshot to the replacement client device 115. The cloud server 130 may receive 440 an indication that a user has logged on to the replacement client device 115 with the set of files in the first backup snapshot (e.g., has accessed a user account including the set of files on the replacement client device). Responsive to the indication, the cloud server 130 may cause 450 a transmission of differential data to the replacement client device 115. The differential data includes at least one file in the second backup snapshot that is not included in the first backup snapshot.

The differential data restoration process may also be improved or optimized. For example, when restoring a file (particularly a large file) which has changed from the first checkpoint to the second checkpoint, in some cases only the changes that occurred in the file are restored. A file may include multiple blocks and offsets. The cloud server 130 may generate a block-wise checksum of the file as appeared in the second snapshot captured in the second checkpoint. The replacement client device 115 may compare the block-wise checksum of the file to a block-wise checksum list that includes the checksum of the file (or the corresponding data block) that is restored in the replacement client device 115. If there is a mismatch between the checksum for a particular block, the block may be restored from the second snapshot stored in the cloud server 130. The restoration may also start from a specific offset of a block. Other blocks in the file that have matching checksums may not need to be restored.

In an embodiment, the cloud server 130 may perform the steps at a second geographic location that is separate from the first geographic location of the administrative server 120. For example, the cloud server 130 may perform the steps at a second geographic location with lower bandwidth. In some embodiments, the cloud server 130 may additionally identify the differential data, as described in conjunction with FIG. 2B.

Figure 5:
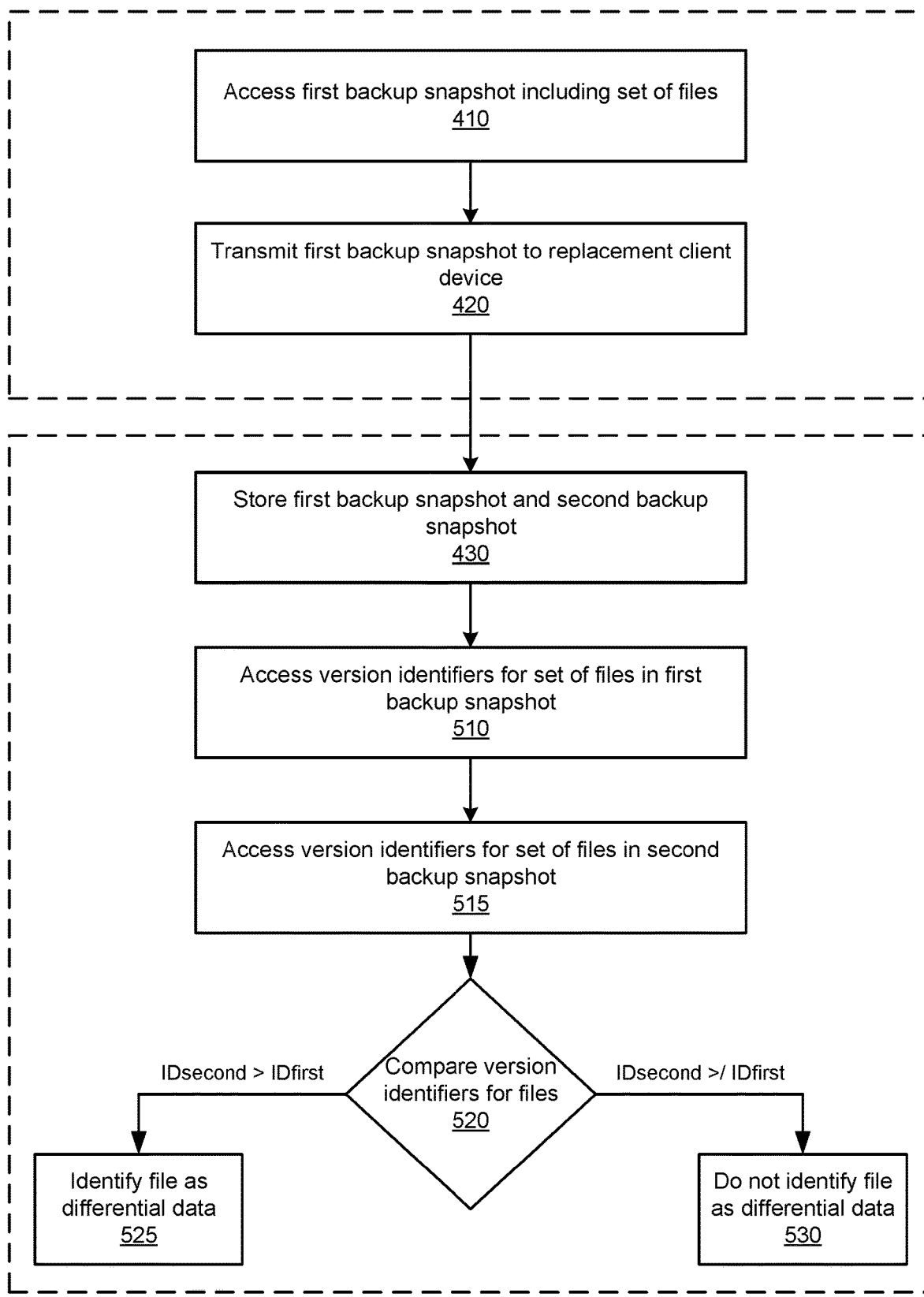
FIG. 5 is a flowchart illustrating a method of identifying differential data based on version identifiers, according to one embodiment.

FIG. 5 is a flowchart illustrating a method of identifying differential data based on version identifiers, according to one embodiment. The embodiment of FIG. 5 may correspond to an example of the process described in conjunction with FIG. 4. The steps of FIG. 5 are performed by the administrative server 120 and/or the cloud server 130 as described below. Some or all of the steps may be performed by other modules or entities in other embodiments. In addition, other embodiments may include different and/or additional steps and the steps may be performed in different orders.

As described in conjunction with FIG. 4, the administrative server 120 may access 410 a first backup snapshot of a retiring client device. The administrative server 120 may transmit 420 the first backup snapshot to the replacement client device 110.

A cloud server 130, which is communicatively coupled to the administrative server 120, may store 430 the first backup snapshot and a second backup snapshot of the retiring client device 110. To identify differential data (e.g., at least one file in the second backup snapshot not included in or different to a corresponding file in the first backup snapshot), the cloud server 130 may access 510 version identifiers associated with the set of files included in the first backup snapshot and access 515 version identifiers associated with the set of files included in the second backup snapshot. As described in conjunction with FIG. 2B, the version identifiers may correspond to checkpoints at which the backup snapshots were generated. The cloud server 130 may compare 520 the version identifier for each file in the second backup snapshot to the corresponding file in the first backup snapshot. When a version identifier for the file of the second backup snapshot is greater than a version identifier for the corresponding file of the first backup snapshot, the cloud server 130 may identify 525 the file as part of the differential data. When the version identifier for the file of the second backup snapshot is not greater than the version identifier for the corresponding file of the first backup snapshot, the cloud server 130 may identify 530 the file as not part of the differential data. For example, if a file is identified as part of the differential data, the file will be restored to the replacement client device 115. Otherwise, the file may be skipped.

As described in FIG. 4, responsive to a login on the replacement client device 115 or responsive to another suitable trigger event, the cloud server 130 may cause a transmission of the identified differential data to the replacement client device 115. For example, the cloud server 130 may directly transmit the identified differential data to the replacement device 115. In another example, the cloud server 130 may cause a client-side server (e.g., a local server) to transmit the identified differential data to the replacement device 115. In one embodiment, the backup snapshots may be copied from a temporary location of the replacement client device to a user account.

Figure 6:
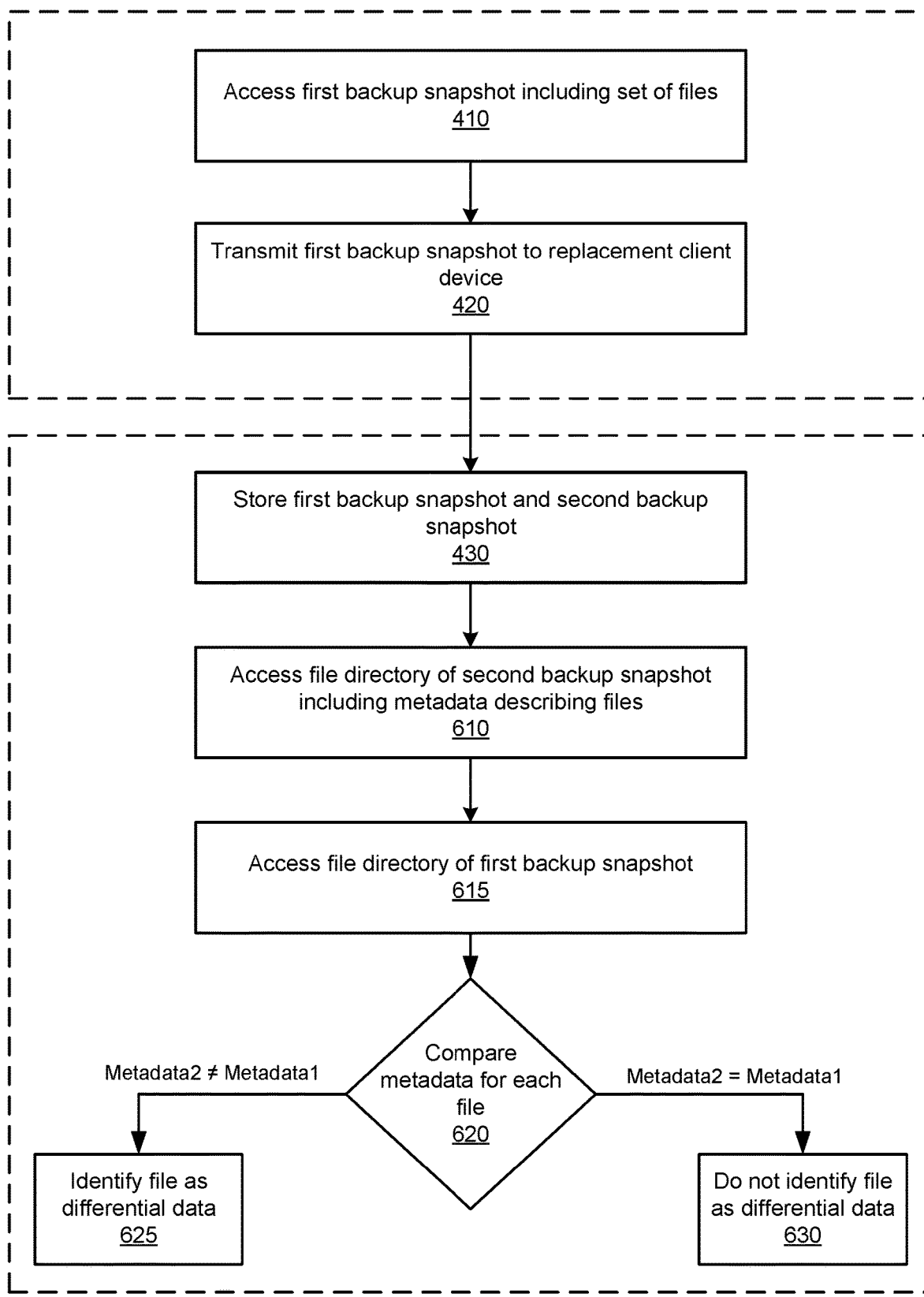
FIG. 6 is a flowchart illustrating a method of identifying differential data based on file metadata, according to one embodiment.

FIG. 6 is a flowchart illustrating an example process of identifying differential data based on file metadata, according to one embodiment. The embodiment of FIG. 6 may correspond to an example of the process described in conjunction with FIG. 4. The steps of FIG. 6 may be performed by the administrative server 120 and/or the cloud server 130 as described below. Some or all of the steps may be performed by other modules or entities in other embodiments. In addition, other embodiments may include different and/or additional steps and the steps may be performed in different orders.

As described in conjunction with FIG. 4, the administrative server 120 may access 410 a first backup snapshot of a retiring client device. The administrative server 120 may transmit 420 the first backup snapshot to the replacement client device 115.

A cloud server 130, which may be communicatively coupled to the administrative server 120, may store 430 the first backup snapshot and a second backup snapshot of the retiring client device 110. To identify differential data, the cloud server 130 may access 610 a file directory of the second backup snapshot, including metadata describing each file stored in the file directory. As described in conjunction with FIG. 2B, the metadata may include, for example, timestamps, ACL checksums representative of the file, or attribute checksums representative of the file. In an embodiment as shown in FIG. 6, the cloud server 130 may access 615 the file directory of the first backup snapshot and compare 620 the metadata for each file of the file directory of the second backup snapshot to a corresponding file of the file directory of the first backup snapshot. In another embodiment, the cloud server 130 may access a database created and maintained on the replacement client device 115 after transmittal of the first backup snapshot to the replacement client device 115. When the metadata of the file of the second backup snapshot does not match the metadata of the corresponding file of the first backup snapshot, the cloud server 130 may identify 625 the file as differential data. When the metadata of the file of the second backup snapshot matches the metadata of the corresponding file of the first backup snapshot, the cloud server 130 does not identify 630 the file as differential data.

As described in FIG. 4, responsive to a login on the replacement client device 115 or responsive to another suitable trigger event, the cloud server 130 causes a transmission of the identified differential data to the replacement client device 115.

By way of a specific use example for the process described in FIG. 6, a first round of data restoration that downloads the first snapshot to a replacement client device 115 may happen at an administrator site. The client (e.g., the replacement client device 115 or another client device) may maintain a list of files restored and the statistics of the files (e.g., timestamps, ACL checksums representative of the file, or attribute checksums). The replacement client device 115, after the initial round of data restoration, may be delivered to a user. After the device is received by the user and user logs in, the replacement client device 115 may initiate the data restoration process again from the latest snapshot created by the retiring client device 110. During this round of data restoration, the replacement client device 115 may walk through the full snapshot on server side and for every file. For example, prior to the start of the second round of data restoration, the replacement client device 115 may check the statistics of files in the cloud server 130 that is currently being maintained. If the statistics match between the file already restored in the replacement client device 115 and the file saved in the cloud server 130, this would indicate that the file is already restored in the first round. The replacement client device 115 bypasses the file and move on. Other files that are saved in the cloud server 130 and whose statistics do not have a match with restored files in the replacement client device 115 may be new files that were created when the replacement client device 115 is in the process of being delivered to the user. The new files may be restored to the replacement client device 115.

Figure 7:
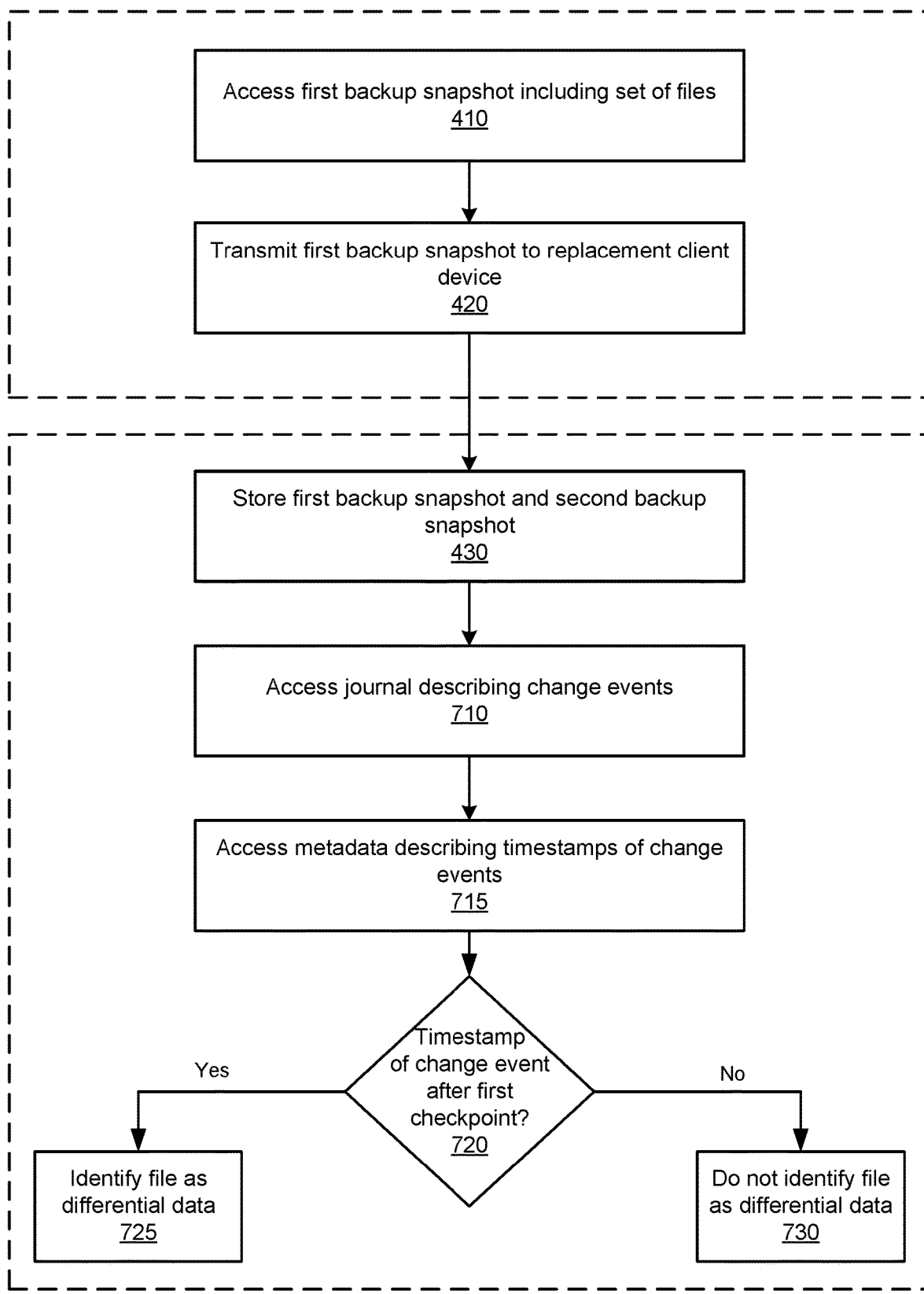
FIG. 7 is a flowchart illustrating a method of identifying differential data based on change event timestamps, according to one embodiment.

FIG. 7 is a flowchart illustrating a process of identifying differential data based on change event timestamps, according to one embodiment. The embodiment of FIG. 7 may correspond to an example of the process described in conjunction with FIG. 4. The steps of FIG. 7 are performed by the administrative server 120 and/or the cloud server 130 as described below. Some or all of the steps may be performed by other modules or entities in other embodiments. In addition, other embodiments may include different and/or additional steps and the steps may be performed in different orders.

As described in conjunction with FIG. 4, the administrative server 120 may access 410 a first backup snapshot of a retiring client device. The administrative server 120 may transmit 420 the first backup snapshot to the replacement client device 110.

A cloud server 130, which is communicatively coupled to the administrative server 120, may store 430 the first backup snapshot and a second backup snapshot of the retiring client device 110. To identify the differential data, the cloud server 130 may access 710 a journal stored in association with corresponding backup snapshots. As described in conjunction with FIG. 2B, the journal describes one or more change events for files of the retiring client device 110. The cloud server 130 may access 715 metadata stored in the journal describing timestamps of change events. For each file in the journal, the cloud server 130 may check 720 for a timestamp of a change event to the file occurring after the first checkpoint. If a timestamp of a change event for a file occurs after the first checkpoint, the cloud server 130 identifies 725 the file as differential data. If a timestamp of a change event for a file does not occur after the first checkpoint, the cloud server 130 does not identify 730 the file as differential data.

As described in FIG. 4, responsive to a login on the replacement client device 115, the cloud server 130 causes a transmission of the identified differential data to the replacement client device 115.

Example Computing Machine Architecture

Figure 8:
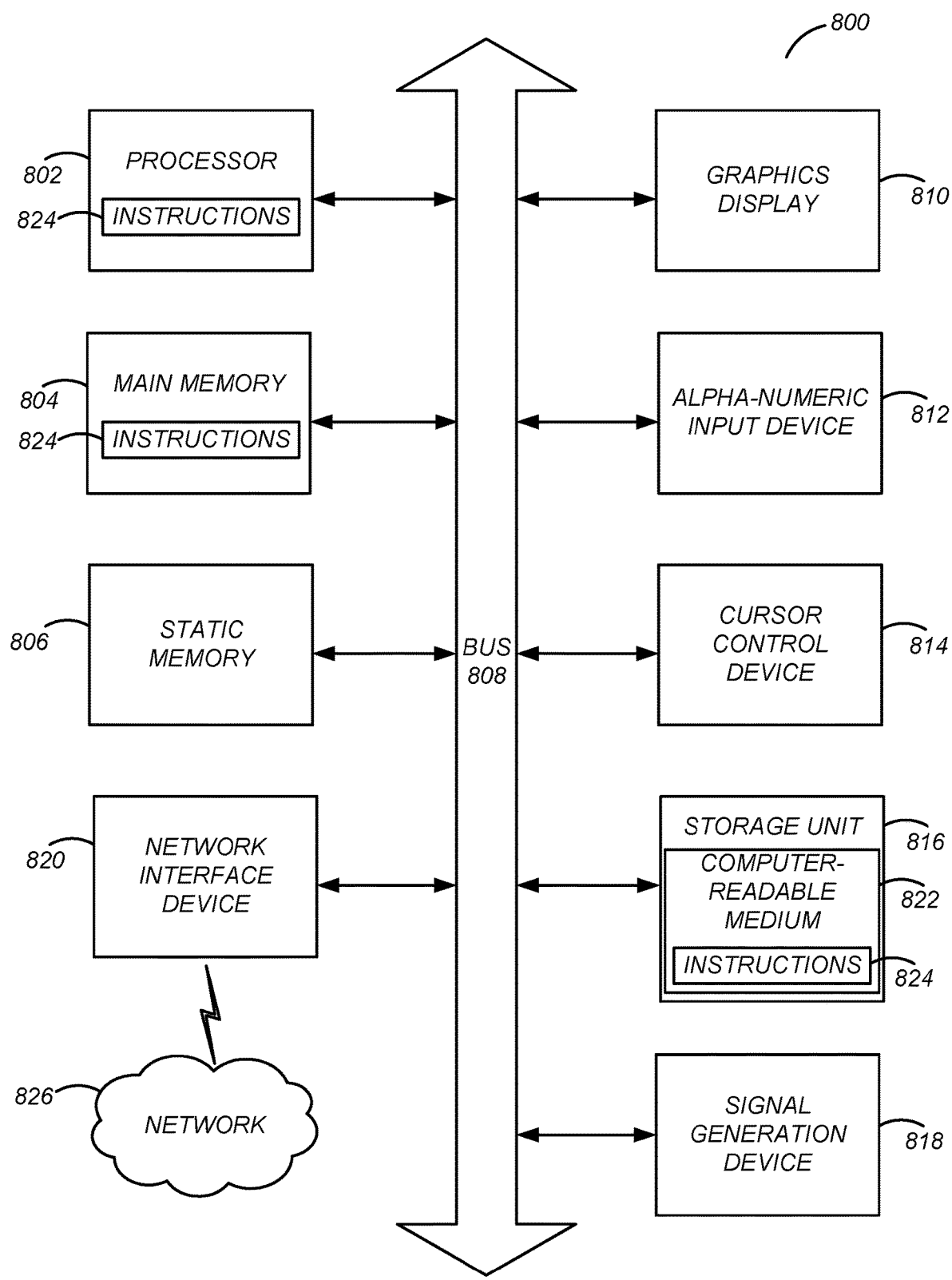
FIG. 8 is a high-level block diagram illustrating physical components of a computer used as part or all of one or more of the entities described herein in one embodiment.

FIG. 8 is a block diagram illustrating components of an example computing machine that is capable of reading instructions from a computer readable medium and execute them in a processor (or controller). A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in, for example, FIGS. 1, 2A, and 2B, including but not limited to, the client devices 110 and 115, the administrative server 120, the cloud server 130, and various engines, modules, interfaces, terminals, and machines shown in FIGS. 1, 2A and 2B. While FIG. 8 shows various hardware and software elements, each of the components described in FIGS. 1, 2A and 2B may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" and "computer" also may be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 800 also may include a memory 804 that store computer code including instructions 824 that may cause the processors 802 to perform certain actions when the instructions are executed, directly or indirectly by the processors 802. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein may improve the operation speed of the processors 802 and reduces the space required for the memory 804. For example, the architecture and methods described herein reduce the complexity of the computation of the processors 802 by applying one or more novel techniques that simplify the steps generating results of the processors 802. The algorithms described herein also reduce the size of the backup data and snapshots to reduce the storage space requirement for memory 804. The processes described herein also speeds up the data restoration and migration processes.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 800 may include a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The graphics display unit 810, controlled by the processors 802, displays a graphical user interface (GUI) to display one or more results and data generated by the processes described herein. The computer system 800 also may include alpha-numeric input device 812 (e.g., a keyboard), a cursor control device 814 (e.g., a mouse, a trackball, a joystick, a motion sensor, or other pointing instrument), a storage unit 816 (a hard drive, a solid state drive, a hybrid drive, a memory disk, etc.), a signal generation device 818 (e.g., a speaker), and a network interface device 820, which also are configured to communicate via the bus 808.

The storage unit 816 includes a computer readable medium 822 on which is stored instructions 824 embodying any one or more of the methodologies or functions described herein. The instructions 824 also may reside, completely or at least partially, within the main memory 804 or within the processor 802 (e.g., within a processor's cache memory) during execution thereof by the computer system 800, the main memory 804 and the processor 802 also constituting computer readable media. The instructions 824 may be transmitted or received over a network 826 via the network interface device 820.

While computer readable medium 822 is shown in an example embodiment to be a single medium, the term "computer readable medium" should be taken to include a single medium or multiple media (e.g., a centralized or distributed database, or associated caches and servers) able to store instructions (e.g., instructions 824). The computer readable medium may include any medium that is capable of storing instructions (e.g., instructions 824) for execution by the processors (e.g., processors 802) and causing the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.

Additional Considerations

Beneficially, the example systems and processes described identify and cause transmission of differential data created during device migration. In some device migration processes, replacement devices are shipped to administrator sites where high bandwidth is expected to be available to perform a transfer of data from an automated data backup to the replacement device. However, data continues to be generated by the user on a retiring device. The example systems and processes enable transmission of the data generated during the device migration process, ensuring that work done during the process is not overwritten, deleted, or otherwise lost. The systems and processes speed up any device restoration while allowing incremental files that are newly generated to be maintained.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, computer readable medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A method comprising:
    storing a first backup snapshot and a second backup snapshot of a retiring client device, the first backup snapshot including a set of files stored in the retiring client device during a first checkpoint, the second backup snapshot including a set of files stored in the retiring client device during a second checkpoint, the second checkpoint occurring after a transmission of the first backup snapshot to a replacement client device;
    receiving an indication that a user has logged on to the replacement client device with the set of files in the first backup snapshot; and
    causing, responsive to the indication, a transmission of differential data to the replacement client device, the differential data including at least one file in the second backup snapshot not included in the first backup snapshot.

2. The method of claim 1, further comprising:
    accessing version identifiers associated with the set of files included in the first backup snapshot, a first subset of the files having a first version identifier corresponding to the first checkpoint;
    accessing version identifiers associated with files included in the second backup snapshot, a second subset of the file having a second version identifier corresponding to the second checkpoint; and identifying one or more files as the differential data, wherein the identified files have version identifiers corresponding to a checkpoint that occurs after the first checkpoint.

3. The method of claim 1, further comprising:
accessing a file directory associated with the second backup snapshot of the retiring client device, the file directory including metadata describing each file stored in the file directory;
accessing metadata describing each file in the set of files associated with the first backup snapshot; and
identifying one or more files wherein metadata describing the file corresponding to the second backup snapshot is different from metadata describing the file corresponding to the first backup snapshot.

4. The method of claim 3, wherein metadata describing each file stored in the file directory includes one or more of: a timestamp, an ACL checksum, or an attribute checksum.

5. The method of claim 1, further comprising:
access a journal stored by a cloud server, the journal describing one or more change events for files of the retiring client device;
access metadata describing a timestamp for the one or more change events described in the journal; and
identify one or more files having a timestamp after the first checkpoint for the retiring client device.

6. The method of claim 5, wherein a change event is one or more of: an addition, a deletion, or a modification to a file of the retiring client device.

7. The method of claim 1, wherein an administrative server and a cloud server are geographically separate.

8. The method of claim 1, further comprising:
accessing a first file in the set of files of the second backup snapshot identified as differential data;
accessing a corresponding file of the set of files of the first backup snapshot;
generating a block-wise checksum for the first file;
generating a block-wise checksum for the corresponding file;
comparing the block-wise checksum for the first file and the block-wise checksum for the corresponding file;
responsive to identifying, from the comparison, a mismatch between the block-wise checksum for the first file and the block-wise checksum for the corresponding file, restoring the blocks of the first file corresponding to the mismatch to the replacement client device.

9. The method of claim 1, further comprising copying the first backup snapshot from a temporary location of the replacement client device to a user account, the first backup snapshot transmitted to the temporary location of the replacement client device by an administrative server.

10. The method of claim 1, wherein causing a transmission of differential data to the replacement client device further comprises causing a client-side server to transmit the differential data to the replacement client device.

11. A system comprising:
an administrative server configured to:
access a first backup snapshot of a retiring client device, the first backup snapshot including a set of files stored in the retiring client device during a first checkpoint; and
transmit the set of files in the first backup snapshot to a replacement client device; and
a cloud server communicatively coupled to the administrative server, the cloud server configured to:
store the first backup snapshot and a second backup snapshot of the retiring client device, the second backup snapshot created during a second checkpoint that occurs after the transmission of the set of files in the first snapshot to the replacement client device;
receive an indication that a user has logged on to the replacement client device with the set of files in the first backup snapshot; and
cause, responsive to the indication, a transmission of differential data to the replacement client device, the differential data including at least one file in the second backup snapshot not included in the first backup snapshot.

12. The system of claim 11, wherein the cloud server is further configured to:
access version identifiers associated with the set of files included in the first backup snapshot, a first subset of the files having a first version identifier corresponding to the first checkpoint;
access version identifiers associated with files included in the second backup snapshot, a second subset of the file having a second version identifier corresponding to the second checkpoint; and
identify one or more files as the differential data, wherein the identified files have version identifiers corresponding to a checkpoint that occurs after the first checkpoint.

13. The system of claim 11, wherein the cloud server is further configured to:
access a file directory associated with the second backup snapshot of the retiring client device, the file directory including metadata describing each file stored in the file directory;
access metadata describing each file in the set of files associated with the first backup snapshot; and
identify one or more files wherein metadata describing the file corresponding to the second backup snapshot is different from metadata describing the file corresponding to the first backup snapshot.

14. The system of claim 13, wherein metadata describing each file stored in the file directory includes one or more of: a timestamp, an ACL checksum, or an attribute checksum.

15. The system of claim 11, wherein the cloud server is further configured to:
access a journal stored by the cloud server, the journal describing one or more change events for files of the retiring client device;
access metadata describing a timestamp for the one or more change events described in the journal; and
identify one or more files having a timestamp after the first checkpoint for the retiring client device.

16. The system of claim 15, wherein a change event is one or more of: an addition, a deletion, or a modification to a file of the retiring client device.

17. The system of claim 11, wherein the administrative server and the cloud server are geographically separate.

18. The system of claim 11, wherein the cloud server is further configured to:
access a first file in the set of files of the second backup snapshot identified as differential data;
access a corresponding file of the set of files of the first backup snapshot;
generate a block-wise checksum for the first file;
generate a block-wise checksum for the corresponding file;
compare the block-wise checksum for the first file and the block-wise checksum for the corresponding file;
responsive to identifying, from the comparison, a mismatch between the block-wise checksum for the first file and the block-wise checksum for the corresponding file, restore the blocks of the first file corresponding to the mismatch to the replacement client device.

19. The system of claim 11, wherein the administrative server is further configured to transmit the first backup snapshot to a temporary location of the replacement client device, and wherein the cloud server is further configured to copy the first backup snapshot from the temporary location of the replacement client device to a user account.

20. The system of claim 11, wherein the cloud server causes the transmission of differential data by causing a client-side server to transmit the differential data to the replacement client device.

\* \* \* \* \*